United States Patent [19]
Albrecht et al.

[11] 3,855,876
[45] Dec. 24, 1974

[54] TELESCOPIC SAFETY STEERING COLUMN FOR MOTOR VEHICLES

[75] Inventors: Wilhelm Albrecht, Vaihingen; Helmut Wulf, Nellingen, both of Germany

[73] Assignee: Daimler-Benz Aktiengesellschaft, Stuttgart, Germany

[22] Filed: May 4, 1973

[21] Appl. No.: 357,084

[30] Foreign Application Priority Data
May 4, 1972 Germany.................... 2221760

[52] U.S. Cl..................... 74/492, 180/90, 188/1 C, 280/87 R
[51] Int. Cl.............................................. B62d 1/18
[58] Field of Search ............... 74/492, 493; 180/90; 280/87 R, 87 A, 150 B; 188/1 C

[56] References Cited
UNITED STATES PATENTS

| | | | |
|---|---|---|---|
| 3,505,897 | 4/1970 | Scheffler et al. | 74/492 |
| 3,703,106 | 11/1972 | Arntson et al. | 74/492 |
| 3,785,671 | 1/1974 | Salewsky | 74/492 |

*Primary Examiner*—Allan D. Herrmann
*Attorney, Agent, or Firm*—Craig & Antonelli

[57] ABSTRACT

A telescopic safety steering column for motor vehicles with a steering wheel displaceable relative to the outer column under energy absorption and with an energy-absorbing connection of the outer column with a front part of the vehicle; the energy-absorbing connection of the outer column with the front part of the vehicle is relatively soft in bending in the direction of an impact of the driver against the steering wheel and is constructed relatively form-stable in the opposite direction by the use of a structural part stressed in tension.

4 Claims, 4 Drawing Figures

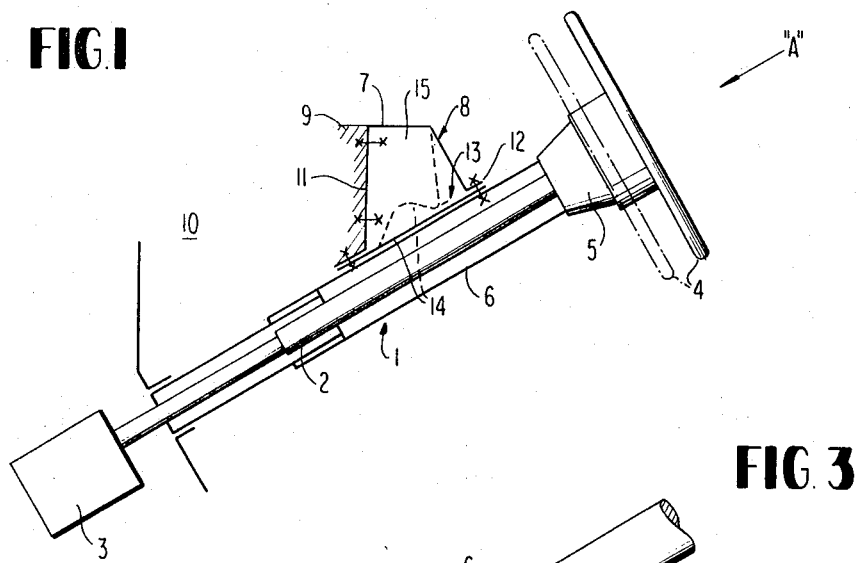
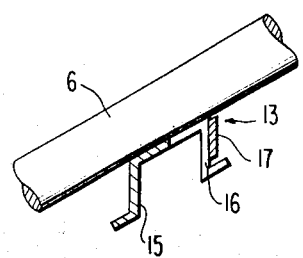
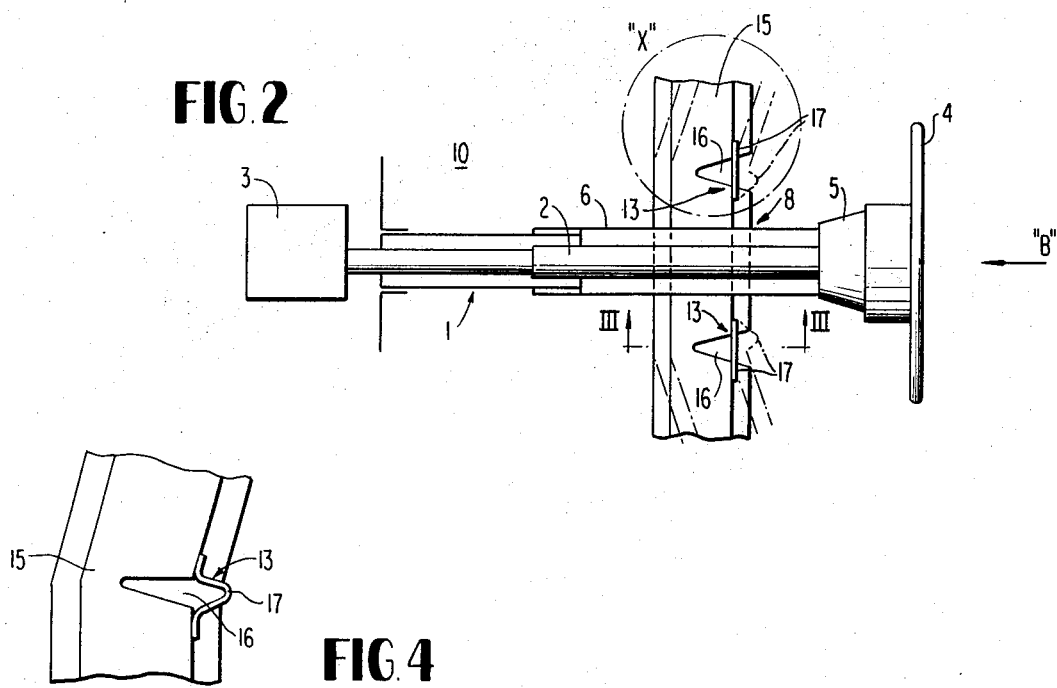

TELESCOPIC SAFETY STEERING COLUMN FOR MOTOR VEHICLES

The present invention relates to a telescopic safety steering column for motor vehicles with a steering wheel displaceable relative to the outer column under energy absorption and with an energy-absorbing connection of the outer column with the front section of the vehicle.

Such a safety steering column is disclosed in the U.S. Pat. No. 3,505,897. The outer column or casing of the steering column is thereby connected with support or bearer parts extending in the vehicle transverse direction by way of several lugs adapted to bend or buckle under energy absorption. If a body impact against the steering wheel occurs during a collision, then the steering wheel deforms as also the adjoining impact pot, and the steering column is displaced in the direction of the steering gear with bending or buckling of the lugs.

However, it also happens frequently in case of a front-end collision that a force introduction takes place by way of the steering gear in the direction toward the steering column. Notwithstanding a telescopic-like construction of the steering column, these types of prior art lugs could not always prevent that the steering column and thus also that the steering wheel is displaced and slides toward the driver because such steering columns, as determined from practical experiences, do not with certainty telescope completely satisfactorily in case of sudden strong loads. As a result thereof, the sliding path or displacement travel in a forward direction necessary for the energy dissipation of the driver impact against the steering wheel is decisively reduced so that a force increase takes place which, for the most part, entails dangerous injuries of the driver.

It is the aim of the present invention to provide in a telescope safety steering column a fastening of the outer column displaceable in the body impact direction under energy absorption, which does not lead to a change in the position of the steering wheel in case of a force introduction in an opposite direction.

Accordingly, a telescopic safety steering column for motor vehicles with a steering wheel displaceable relative to the outer column under energy absorption and with an energy-absorbing connection of the outer column with the front section of the vehicle is proposed in which, according to the present invention, the energy-absorbing connection of the outer column to the vehicle front section is constructed soft in bending in a manner, known as such, in the direction of body impact and is constructed form-stable or form-rigid in the opposite direction by a structural part stressed in tension.

In one advantageous embodiment of the present invention, this structural part may be a tensioning band made of a material with high tensile strength, which extending approximately parallel to the outer column is connected, on the one hand, with the front part of the vehicle and, on the other, with the yielding leg of a bracket.

The bracket may carry out a supporting function if it extends beyond the outer column area and has an overall bearer-shaped configuration.

An increase of the energy-absorption capability with only a slight weight increase can be achieved if the hollow space of the bracket is filled with a material absorbing energy during compression.

In another advantageous embodiment of the present invention, the energy-absorbing connection can be constituted by a vehicle cross bearer which is provided with notches preferably arranged symmetrically to the outer column secured thereon, which are covered off externally by a band of a material of high tensile strength.

Accordingly, it is an object of the present invention to provide a telescopic safety steering column for motor vehicles which avoids by simple means the aforementioned shortcomings and drawbacks encountered in the prior art.

Another object of the present invention resides in a telescopic safety steering column for motor vehicles which is able to perform its intended function regardless of the direction of introduction of the forces into the steering column.

A further object of the present invention resides in a telescopic safety steering column for motor vehicles which prevents a change in the position of the steering wheel during a frontal collision causing an introduction of forces into the steering column from in front of the vehicle.

A still further object of the present invention resides in a telescopic safety steering column for motor vehicles which does not decrease to any significant extent the displacement path for the energy dissipation in case of an impact of the driver against the steering wheel regardless of the type of accident the vehicle is involved.

Another object of the present invention resides in a safety steering column for motor vehicles which is simple in construction, utilizes relatively few and simple parts that can be readily manufactured, and permits an increase in the energy-absorption capacity by simple means.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic side view of a telescopic safety steering column in accordance with the present invention in which the outer column is operatively connected with a vehicle cross bearer under interposition of a bracket;

FIG. 2 is a plan view of a modified embodiment of a telescopic safety steering column in accordance with the present invention in which the outer column is directly connected with an energy-absorbing vehicle cross bearer;

FIG. 3 is a cross-sectional view taken along line III—III of FIG. 2; and

FIG. 4 is a view, on an enlarged scale, illustrating the details indicated by the circle X in FIG. 2.

Referring now to the drawing wherein like reference numerals are used throughout the various views to designate like parts, and more particularly to FIG. 1, according to this figure a safety steering column generally designated by reference numeral 1 consists of a steering spindle 2 adapted to be reduced in its effective length which is operatively connected at one end with a steering gear 3 and at the other end with a steering wheel 4 provided with an impact pot 5, and of a telescopic outer column 6 surrounding the steering spindle 2; the safety steering column 1 is secured by means of a bracket 7—which represents an energy-absorbing connection generally designated by reference numeral 8—at a vehicle cross bearer 9 within the area of the vehicle front part 10 not illustrated in detail.

The bracket 7 is thereby securely connected with the vehicle cross bearer 9 by means of a leg portion 11 thereof and includes a flange 12 extending parallel to the outer column 6 in the direction of the steering wheel 4. If a force introduction takes place in the direction of the arrow A, then all of the safety devices of the steering column operate in a conventional manner, and the bracket 7 as well as a structural part 13 which represents a band-shaped tensioning member 14 consisting of a material of high tensile strength which, on the one hand is rigidly connected with the flange 12 and the outer column 6, and on the other, is rigidly connected with the vehicle cross bearer 9, are transfigured into the shape indicated in dash lines under energy absorption. The absorption capability can be increased if the hollow space 15 of the bracket 7 is filled, for example, with a foamed material of any conventional type.

If a force introduction takes place in a direction opposite the direction of arrow A, then a shortening of the effective length of the steering spindle 2 takes place, however, the flange 12 retains its original shape since the intermediate member 14 is now stressed in tension.

Differing from the embodiment according to FIG. 1, in the embodiment according to FIGS. 2-4, the energy absorbing connection 8 is constituted by a vehicle cross bearer 15 itself. This cross bearer 15 is provided with notches 16 preferably arranged symmetrically to the outer column 6 secured thereon; the notches 16 are covered off on the outside by a band 17 of a material of high tensile strength. While the outer column 6 may be secured to the cross bearer 15 by welding or the like, it is understood that the securing of the outer column 6 could be achieved in other conventional manners.

With a force introduction in the direction of the arrow B, the vehicle cross bearer 15 deforms and assumes at the end approximately a position indicated in dash lines. The bands 17 also deform as indicated in FIG. 2. The deformed position is illustrated particularly clearly in FIG. 4.

If the force introduction takes place in a direction opposite to the arrow B then the vehicle cross bearer 15 and thus also the steering wheel 4 retains its original position since now the bands 17 are subjected to a tensional load and stress.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A telescopic safety steering column for motor vehicles which includes an outer column means, a steering wheel displaceable relative to the outer column means under energy absorption, the improvement comprising an energy absorbing connection means for connecting the outer column means with a front part of the vehicle, said energy-absorbing connection means from the outer column means to the vehicle front part being relatively soft in bending in the impact direction of a body, said energy-absorbing connection means including a structural member stressed in tension so as to render said energy-absorbing connection means form-stable in an opposite direction, and a vehicle cross bearer means provided with notch means, said notch means being covered off on the outside by said structural member, said structural member being composed of a material having a relatively high tensile strength.

2. A safety steering column according to claim 1, wherein said structural member is a band-shaped member.

3. A safety steering column according to claim 1, wherein said outer column is secured to said vehicle cross bearer means, said notch means being arranged substantially symmetrically to the outer column means.

4. A safety steering column according to claim 3, wherein said structural member is a band-shaped member.

* * * * *